(12) United States Patent
Zhong (10) Patent No.: US 12,448,802 B1
(45) Date of Patent: Oct. 21, 2025

(54) WATER SURFACE CLEANING ROBOT (71) Applicant: SHENZHEN HAIXIN ROBOT TECHNOLOGY CO., LTD., Guangdong (CN)

(72) Inventor: Guixin Zhong, Guangdong (CN)

(73) Assignee: SHENZHEN HAIXIN ROBOT TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/014,146

(22) Filed: Jan. 8, 2025

(30) Foreign Application Priority Data

Jul. 17, 2024 (CN) .......................... 202421705944.4
Jul. 17, 2024 (CN) .......................... 202421706483.2

(51) Int. Cl.
*E04H 4/12* (2006.01)
*E04H 4/16* (2006.01)

(52) U.S. Cl.
CPC ......... *E04H 4/1263* (2013.01); *E04H 4/1654* (2013.01)

(58) Field of Classification Search
CPC ............................ E04H 4/1263; E04H 4/1654
USPC ............................... 210/167.1, 167.19, 167.2
See application file for complete search history.

(56) References Cited

U.S. PATENT DOCUMENTS

| 4,454,035 A * | 6/1984 | Stefan | E04H 4/1272 |
| | | | 210/123 |
| 2015/0322684 A1* | 11/2015 | Renaud | E04H 4/1654 |
| | | | 15/1.7 |
| 2016/0051913 A1* | 2/2016 | Witelson | B01D 29/6415 |
| | | | 210/241 |
| 2018/0066444 A1* | 3/2018 | van der Meijden | E04H 4/1654 |
| 2018/0249685 A1* | 9/2018 | Favie | E04H 4/1654 |
| 2021/0197932 A1* | 7/2021 | Wu | B63B 35/32 |

FOREIGN PATENT DOCUMENTS

| CN | 118220426 A | * | 6/2024 | |
| CN | 118327358 A | * | 7/2024 | B63B 35/32 |

OTHER PUBLICATIONS

Machine-generated English translation of CN 118327358, generated on Mar. 25, 2025.*
Machine-generated English translation of CN 118220426, generated on Mar. 25, 2025.*

* cited by examiner

*Primary Examiner* — Fred Prince (57) ABSTRACT

A water surface cleaning robot is provided, which includes a robot body, a container, a cover plate, and a moving assembly. The robot body is configured to clean garbage on a water surface, the robot body is defined with a mounting cavity, and a top of the robot body being defined with an opening communicated with the mounting cavity. The container is detachably mounted in the mounting cavity of the robot body, and is configured to store garbage collected by the robot body. The cover plate is configured to open or cover the opening. The cover plate includes a cover plate body, a rotating connection structure, and a locking structure. The moving assembly is mounted on the robot body, and is configured to drive the robot body to move on the water surface.

15 Claims, 8 Drawing Sheets

WATER SURFACE CLEANING ROBOT

TECHNICAL FIELD

The present disclosure relates to the technical field of cleaning water surface, and in particular to a water surface cleaning robot.

BACKGROUND

A water surface cleaning robot is a robot for cleaning waste, pollutants, and floating debris from water surface. The water surface cleaning robot in the related art includes a robot body and a container. The container is fixedly disposed in the robot body and is exposed from the top of the robot body. Garbage is dumped through a top opening of the robot body.

In practical applications, the aforementioned water surface cleaning robot in the related art has the following defects:

(1) When dumping the garbage in the container, it is necessary to tilt the robot body, which is inconvenient for operations.

(2) During the process of the water surface cleaning robot collecting garbage, if garbage full fills the container, the garbage will directly overflow from the top opening.

SUMMARY

The present disclosure provides a water surface cleaning robot, to solve the problem that it is inconvenient to empty garbage collected in the container of the water surface cleaning robots in the related art.

To realize the above objective, the present disclosure provides a water surface cleaning robot, including:
- a robot body, configured to clean garbage on a water surface, the robot body being defined with a mounting cavity, and a top of the robot body being defined with an opening communicated with the mounting cavity;
- a container detachably mounted in the mounting cavity of the robot body, the container being configured to store garbage collected by the robot body;
- a cover plate, configured to open or cover the opening;
- wherein, the cover plate includes a cover plate body, a rotating connection structure disposed on one side of the cover plate body, and a locking structure disposed on the other opposite side of the cover plate body;
- the rotating connection structure is rotatably connected with one side edge of the opening, and the locking structure is latched with the other side edge of the cavity; and
- a moving assembly mounted on the robot body, the moving assembly being configured to drive the robot body to move on the water surface.

In some embodiments, the other opposite side edge of the opening is defined with an engaging groove. The locking structure includes: a base connected with the cover plate body or integrally formed with the cover plate body; a locking tongue retractably mounted on the base, the locking tongue being configured to be engaged with the engaging groove; an unlocking handle rotatably connected to the base and connected to the locking tongue, the unlocking handle being configured to rotate relative to the base under an action of an external force and drive the locking tongue to disengage from the engaging groove to retract into the base; and a first elastic member connected between the unlocking handle and the base, the first elastic member being configured to drive the unlocking handle to reset the locking tongue when the external force applied to the unlocking handle is removed.

In some embodiments, the first elastic member is one of two first elastic members, and the two first elastic members are spaced apart along a length direction of the unlocking handle.

In some embodiments, a power supply is provided in the robot body; and a solar panel is provided on a side of the cover plate body facing away from the opening, and the solar panel is electrically connected to the power supply.

In some embodiments, the container includes: a bin body, the bin body being defined with a receiving cavity and an inlet communicated with the receiving cavity, the inlet being configured to allow the garbage to enter the receiving cavity, the receiving cavity being configured to store the garbage, and the receiving cavity being provided with two cavity walls that are spaced and face each other; and at least one blocking member protruded from at least one of the two cavity walls, the at least one blocking member being configured to block the garbage in the receiving cavity from overflowing toward the inlet along the cavity walls.

In some embodiments, each of the two cavity walls is provided with the blocking member, each of the two blocking members includes a connecting end and a free end, the connecting end is connected to the cavity wall, the free end extends in the receiving cavity, a distance from the connecting end to the inlet is smaller than a distance from the free end to the inlet, and the two blocking members extend from the connecting ends to the free ends with a gradually decreasing distance therebetween.

In some embodiments, the container further includes a guide plate, the guide plate is disposed below the inlet, and the guide plate extends obliquely upward toward a side where the receiving cavity is located with an inclination angle of 45°±10° relative to a horizontal line.

In some embodiments, the container further includes a cleaning assembly rotatably mounted at the inlet, and the cleaning assembly is configured to clean the garbage and transfer the garbage to the receiving cavity through the inlet.

In some embodiments, the cleaning assembly includes a main rod body and a plurality of blades arranged at intervals on an outer periphery of the main rod along a circumferential direction of the main rod body; or the cleaning assembly is a cleaning roller.

In some embodiments, a top of the bin body is provided with a handle for users to hold the container.

In some embodiments, the top of the bin body is defined with a recess, and a bottom of the recess is defined with a water hole communicated with the receiving cavity; and the handle is arranged across an opening of the recess.

In some embodiments, a top and/or a side of the bin body is provided with a viewing window for observing collection of the garbage in the receiving cavity.

In some embodiments, a bottom of the bin body is defined with an outlet and a lid body, and the lid body is configured to open or close the outlet; wherein one end of the lid body is rotatably connected with the bin body, and the other end of the lid body is snap-fitted with the bin body.

In some embodiments, the water surface cleaning robot further includes: an anti-collision assembly, the anti-collision assembly including at least an outer side portion protruding from the robot body.

In some embodiments, the anti-collision assembly is a roller or a bearing rotatably connected to an outer side wall of the robot body.

In some embodiments, the water surface cleaning robot further includes: an ultrasonic sensing component disposed on a front side of the robot body.

According to the embodiments of the present disclosure, the robot body, driven by the moving assembly, cleans the garbage on the water surface. The robot body is defined with the mounting cavity to provide a space for mounting the container. The cover plate body is disposed at the opening of the mounting cavity for opening or covering the opening. To facilitate easy opening, the rotating connection structure and the locking structure are respectively disposed on two opposite sides of the cover plate body, such that the rotating connection structure is ratably connected to one side edge of the opening, and the locking structure is latched with the other side edge of the opening. In this way, when emptying the container, users may unlock the locking structure, and rotate the cover plate body to open the cover plate. Then, users may remove the container from the mounting cavity and dump the garbage. After dumping, users may place the container back into the mounting cavity, and then close the cover plate. The process of emptying the garbage from the container is very convenient. Moreover, the cover plate covers the opening over the top of the container, preventing the garbage from overflowing directly from the opening at the top of the robot body.

The realizing of the aim, functional characteristics and advantages of the present disclosure are further described in detail with reference to the accompanying drawings and the embodiments.

DETAILED DESCRIPTION OF THE EMBODIMENTS

The technical solutions in the embodiments of the present disclosure will be described clearly and completely with reference to the accompanying drawings in the embodiments of the present disclosure. Obviously, the described embodiments are only a part of the embodiments of the present disclosure rather than all of them. Based on the embodiments in the present disclosure, all other embodiments obtained by those skilled in the art without creative work shall fall within the scope of protection of the present disclosure.

It should be noted that all directional indications (such as up, down, left, right, front, back) in the embodiments of the present disclosure are merely configured to explain relative position relationships or motion conditions between the components in a specific attitude (as shown in the drawings). The directional indication changes as the specific attitude changes.

It should be noted that when an element is described as "being fixed on" or "being arranged on" another element, the element may be directly arranged on the another element or there may be an intermediate element. When an element is described as "being connected to" another element, the element may be directly connected to the another element or there may be an intermediate element.

Moreover, the terms "first", "second", and the like in the present disclosure are merely used for description and cannot be understood as indicating or implying their relative importance or as implicitly indicating the quantity of the technical features indicated. Thus, the feature defined by "first" or "second" may explicitly or implicitly include at least one such feature. In addition, the technical solutions of various embodiments may be combined with each other, but must be based on that the combined technical solutions can be implemented by those skilled in the art. When the combination of the technical solutions is contradictory or impossible to realize, it shall be considered that such combination does not exist and is not within the scope of protection of the present disclosure.

Figure 1:
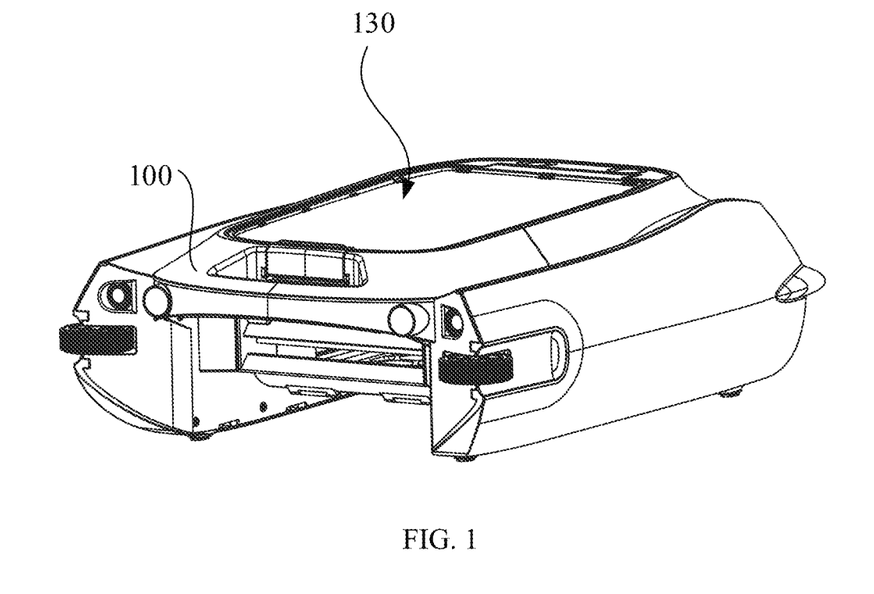
FIG. 1 is an overall structure diagram of a water surface cleaning robot according to an embodiment of the present disclosure.
Figure 2:
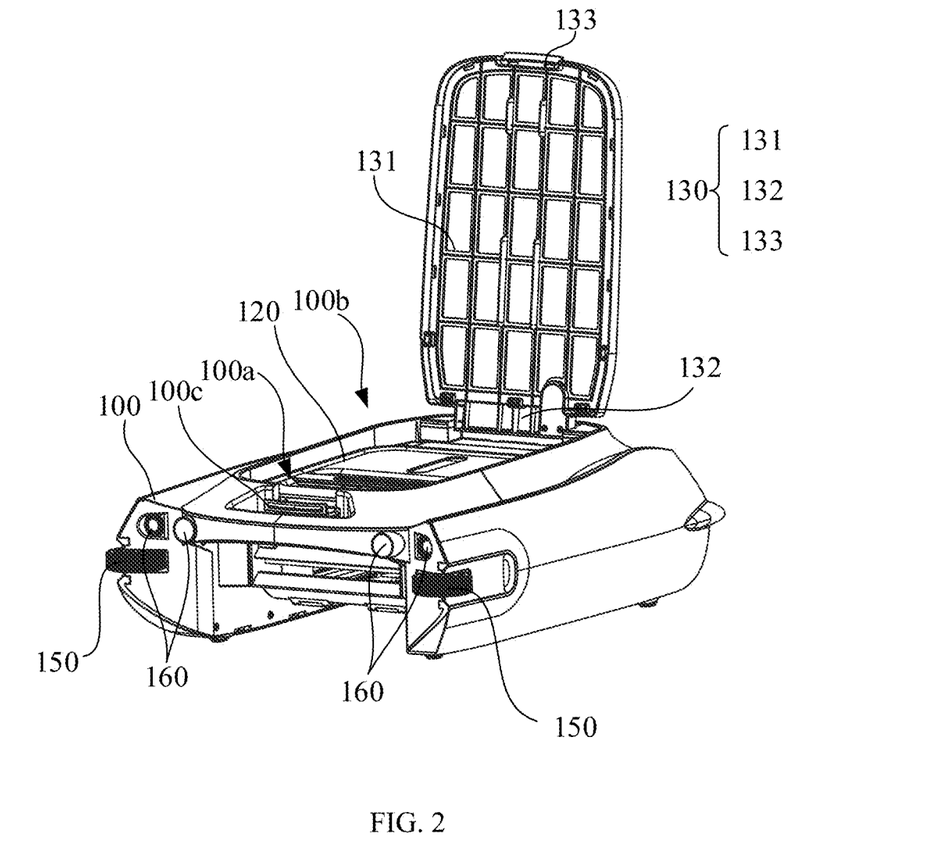
FIG. 2 is an overall structure diagram of a water surface cleaning robot according to another embodiment of the present disclosure.

Referring to FIG. 1 and FIG. 2, FIG. 1 is an overall structure diagram of a water surface cleaning robot according to an embodiment of the present disclosure, and FIG. 2 is an overall structure diagram of a water surface cleaning robot according to another embodiment of the present disclosure.

The embodiments of the present disclosure provide a water surface cleaning robot, which includes a robot body 100, a container 120, a cover plate 130, and a moving assembly 141.

The robot body 100 is configured to clean garbage on a water surface. The robot body 100 is defined with a mounting cavity 100a, and a top of the robot body 100 is defined with an opening 100b communicated with the mounting cavity 100a.

The container 120 is mounted in the mounting cavity of the robot body 100 through the opening 100b, and is configured to store garbage collected by the robot body 100.

The cover plate 130 is configured to open or cover the opening 100b.

The cover plate 130 includes a cover plate body 131, a rotating connection structure 132 disposed on one side of the cover plate body 131, and a locking structure 133 disposed on the other opposite side of the cover plate body 131.

The rotating connection structure 132 is rotatably connected with one side edge of the opening 100b, and the locking structure 133 is latched with the other side edge of the opening 100b.

The moving assembly 141 is mounted on the robot body 100, and is configured to drive the robot body 100 to move on the water surface.

The embodiments provides the water surface cleaning robot for cleaning the garbage on the water surface. The water surface cleaning robot includes the robot body 100, the container 120, and the cover plate 130. The robot body 100 is mainly configured to move on the water surface and clean the garbage, and it is defined with the mounting cavity 100*a* having its top open for accommodating the container 120. The container 120 is configured to store the garbage collected by the robot body 100.

In the embodiments, the robot body 100 generally includes a body, a roller brush, and a driving mechanism, so as to move on the water surface and collect debris and waste on the water surface.

The cover plate body 131 is mainly configured to open or cover the opening 100*b*. The robot body 100 is mainly configured to provide a place for mounting a column of the cover plate 130, support and receive functional components, and move on the water surface to perform garbage cleaning tasks. In some embodiments, the robot body 100 is defined with the mounting cavity 100*a* with its top opened for mounting and fixing the container 120. The container 120 is configured to store the garbage collected by a cleaning assembly of the robot body 100, ensuring that the garbage is effectively collected and stored during the cleaning process.

In some embodiments, in order to reduce the water flow resistance, the robot body 100 and the container 120 may be designed to be streamlined or flattened. This allows the water surface cleaning robot to move more smoothly and efficiently on the water surface.

During the water surface cleaning robot moving on the water surface by the moving assembly 141 (e.g., a propeller), the cleaning assembly collects and transfers the garbage on the water surface into the container 120. When the container 120 is full with garbage, users may operate the locking structure 133 to easily open the cover plate body 131. For example, users simply need to unlock the locking structure 133, to allow the cover plate body 131 to rotate and open from one side edge of the opening 100*b*, and take out the container 120 from the mounting cavity 100*a* to dump the garbage. In the embodiments, by providing the rotating connection structure 132 and the locking structure 133, the cover plate 130 remains securely closed during garbage collection, even in the event of collisions, thereby preventing the garbage from overflowing. This also enables users to conveniently open the cover plate 130 for garbage cleaning and device maintenance.

According to technical solution provided in the embodiments, the robot body 100, driven by the moving assembly 141, cleans the garbage on the water surface. The robot body 100 is defined with the mounting cavity 100*a* which provides a space for placing the container 120 that is configured to store the garbage collected by the robot body 100. The cover plate body 131 is disposed at the opening 100*b* of the mounting cavity 100*a* for opening or covering the opening 100*b*. To facilitate easy opening, the rotating connection structure 132 and the locking structure 133 are respectively disposed on two opposite sides of the cover plate body 131, such that the rotating connection structure 132 is ratably connected to one side edge of the opening 100*b*, and the locking structure 133 is latched with the other side edge of the opening 100*b*. In this way, users can easily unlock the locking structure 133 to access the container 120. The rotating connection structure 132 allows the cover plate body to open and close smoothly and effortlessly, making it very convenient for users to remove and replace the container 120. Additionally, the locking structure 133 provides a reliable locking function that ensures the cover plate 130 remaining securely closed during operation, preventing accidental openings caused by water impact or collisions with the shore, and etc. This enhances the safety and stability of the water surface cleaning robot.

Figure 3:
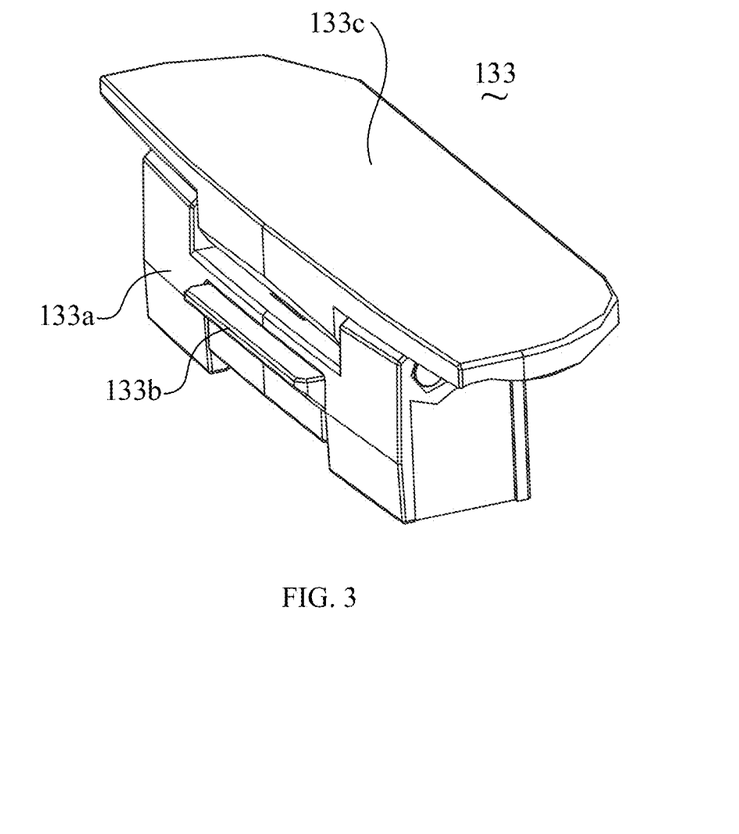
FIG. 3 is a structure diagram of a locking structure according to an embodiment of the present disclosure.

Referring to FIG. 2 and FIG. 3, FIG. 2 is an overall structure diagram of a water surface cleaning robot according to another embodiment of the present disclosure, and FIG. 3 is a structure diagram of a locking structure according to an embodiment of the present disclosure.

In the embodiments, a side edge of the opening 100*b* is defined with a engaging groove 100*c*.

The locking structure 133 includes a base 133*a*, a locking tongue 133*b*, an unlocking handle 133*c*, and a first elastic member 133*d*.

The base 133*a* is connected with the cover plate body 131 or integrally formed with the cover plate body 131.

The locking tongue 133*b* is retractably mounted on the base 133*a*, and is configured to be latched in the engaging groove 100*c*.

The unlocking handle 133*c* is rotatably connected with the base 133*a*, and it is connected with the locking tongue 133*b*, such that it rotates relative to the base 133*a* under an action of an external force, and drives the locking tongue 133*b* to disengage from the engaging groove 100*c* to retract into the base 133*a*.

The first elastic member 133*d* is connected between the unlocking handle 133*c* and the base 133*a*, and is configured to drive the unlocking handle 133*c* to bring the locking tongue 133*b* back to an initial position of the locking tongue 133*b* when the external force applied on the unlocking handle 133*c* is removed.

In the embodiments, one side edge of the opening 100*b* is defined with the engaging groove 100*c*; and the locking structure 133 includes the base 133*a*, the locking tongue 133*b*, the unlocking handle 133*c*, and the first elastic member 133*d*.

The base 133*a* may be connected to the cover plate body 131 or integrally formed with the cover plate body 131. In the case that the base 133*a* is connected to the cover plate body 131, the two may be secured with a fastener such as a screw or a rivet to ensure the stability. In the case that the base 133*a* is integrally formed with the cover plate body 131, the two may be manufactured using a one-time molding process, which reduces the number of parts and enhances the structural strength.

In some embodiments, the locking tongue 133*b* may have a flat elongated strip structure or a cylindrical structure, and it may be made of stainless steel or high-strength plastic to ensure durability and corrosion resistance during frequent operations. The unlocking handle 133*c* is rotatably connected to the base 133*a* via a hinge, and the hinge may be made of metal to increase durability. The unlocking handle 133*c* may be connected to the locking tongue 133*b* in a manner of a mechanical linkage structure. When the unlocking handle 133*c* rotates, it drives the locking tongue 133*b* to disengage from the engaging groove 100*c* and retract into the base 133*a* by an internal lever mechanism.

The first elastic member 133*d* is disposed between the unlocking handle 133*c* and the base 133*a*, and it may be a coil spring or a torsion spring. The first elastic member 133*d* is configured to drive the unlocking handle 133*c* to reset the locking tongue 133*b* when the external force applied on the unlocking handle 133*c* is removed.

In an unlocking process, users may apply an external force to rotate the unlocking handle 133*c* relative to the base 133*a*, then the locking tongue 133*b* is driven to disengage from the engaging groove 100*c* by an internal lever mechanism, allowing the locking tongue 133*b* to retract into the base 133*a*. As a result, the cover plate body 131 can be opened from the opening 100*b*. In the locking process, users may close the cover plate body 131 over the opening 100*b*, and the locking tongue 133b automatically extends out and is engaged in engaging groove 100c, allowing the cover plate body 131 to be securely closed at the opening 100b.

In the embodiments, by providing the base 133a, the locking tongue 133b, and the unlocking handle 133c, the locking structure 133 can reliably lock and unlock the cover plate 130. The locking structure 133 can remain stable even under conditions of water impact or collision, preventing waste overflow. Additionally, the unlocking handle 133c allows users to operate it effortlessly without additional tools, enhancing the convenience and user experience of the water surface cleaning robot. The first elastic member 133d ensures an automatic reset of the locking tongue 133b, simplifying the operation process and improving the reliability and durability of the locking mechanism.

Continuing to refer to FIG. 3, in the embodiments, two first elastic members 133d are provided, and the two first elastic members 133d are spaced along a length direction of the unlocking handle 133c.

In the embodiments, the number of the first elastic members 133d is two, and the two first elastic members 133d are spaced along the length direction of the unlocking handle 133c. Compared with the configuration that a single first elastic member 133d is centrally disposed, this design ensures that the unlocking handle 133c evenly distributes the pressure when subjected to a force, thereby improving the smoothness and reliability of the unlocking and locking operations.

Figure 4:
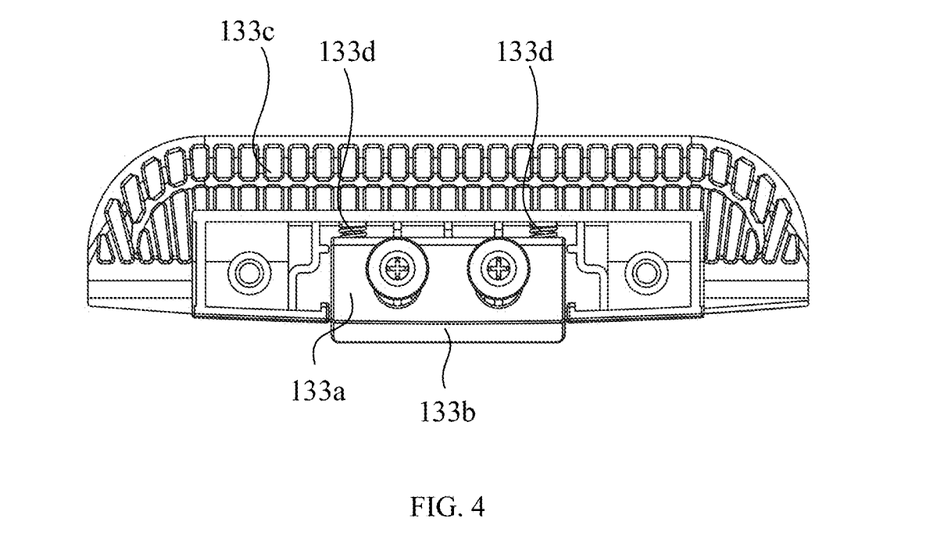
FIG. 4 is a top view of a locking structure according to an embodiment of the present disclosure.

Referring to FIG. 4, FIG. 4 is a top view of a locking structure according to an embodiment of the present disclosure.

In some embodiments, a power supply 170 is provided in the robot body 100.

A solar panel 140 is disposed on the side of the cover plate body 131 facing away from the opening 100b, and the solar panel 140 is electrically connected to the power supply 170.

In the embodiments, the power supply 170 is disposed in the robot body 100, and the solar panel 140 is disposed on the side of the cover plate body 131 facing away from the opening 100b. The solar panel 140 is electrically connected to the power supply 170 to achieve efficient energy supply and endurance.

In some embodiments, the power supply 170 built in the robot body 100 may be a rechargeable battery, such as a lithium-ion battery or a nickel-metal hydride battery, to provide the power required for the water surface cleaning robot to move on the water surface and clean the garbage. The power supply 170 is mounted inside the robot body 100 with design considerations of waterproofing and shock resistance, to ensure a stable operation in various water surface environments.

The solar panel 140 is disposed on the side of the cover plate body 131 facing away from the opening 100b, and the solar panel 140 is made of a high-efficiency monocrystalline silicon material, which enables rapid charging under conditions of ample sunlight, thereby increasing the endurance time and work efficiency of the water surface cleaning robot. The solar panel 140 is electrically connected to the power supply 170 via a waterproof cable, ensuring safety and stability of electrical power transmission.

During actual operation, the water surface cleaning robot is powered by the built-in power supply 170, which drives it to move on the water surface and clean the garbage. When the water surface cleaning robot performs tasks on the water surface, the solar panel 140 can simultaneously receive sunlight and convert it into electrical energy, which is then stored in the power supply 170. In this way, even during extended cleaning operations, the water surface cleaning robot can maintain its power supply through solar charging, thereby reducing reliance on external power sources.

In some embodiments, after completing the garbage collection and cleaning tasks, users may check a power level via a monitoring system. If necessary, the water surface cleaning robot may be charged by the solar panel 140 without the need for frequent battery replacement or downtime for charging.

In the embodiments, by providing the solar panel 140, the water surface cleaning robot makes full use of natural energy, extending its operational duration and reducing operating costs. Solar charging is an environmentally friendly and efficient manner that decreases dependence on power grid resources, aligning with the principles of green and sustainable development. The combination of the solar panel 140 with the power system enables the water surface cleaning robot to work stably under different weather conditions. Even on overcast days or in partially shaded environments, the solar panel 140 can still provide a certain level of power support, enhancing the reliability and practicality of the water surface cleaning robot.

Figure 5:
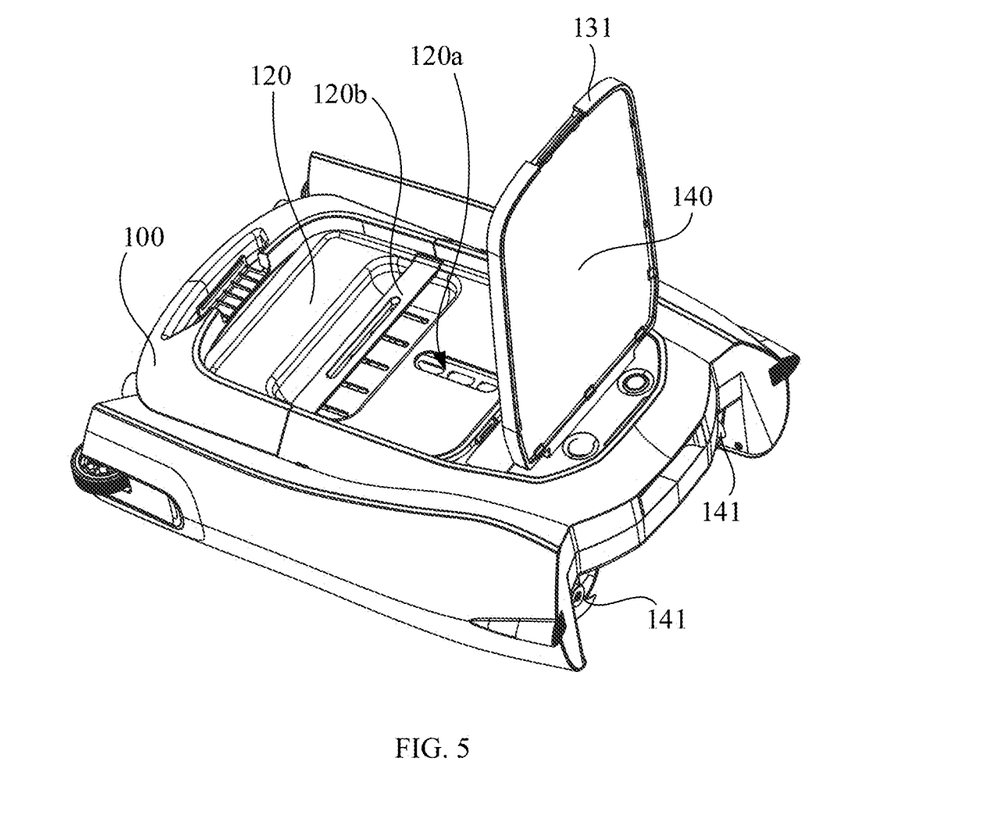
FIG. 5 is an overall structure diagram of a water surface cleaning robot according to still another embodiment of the present disclosure.
Figure 6:
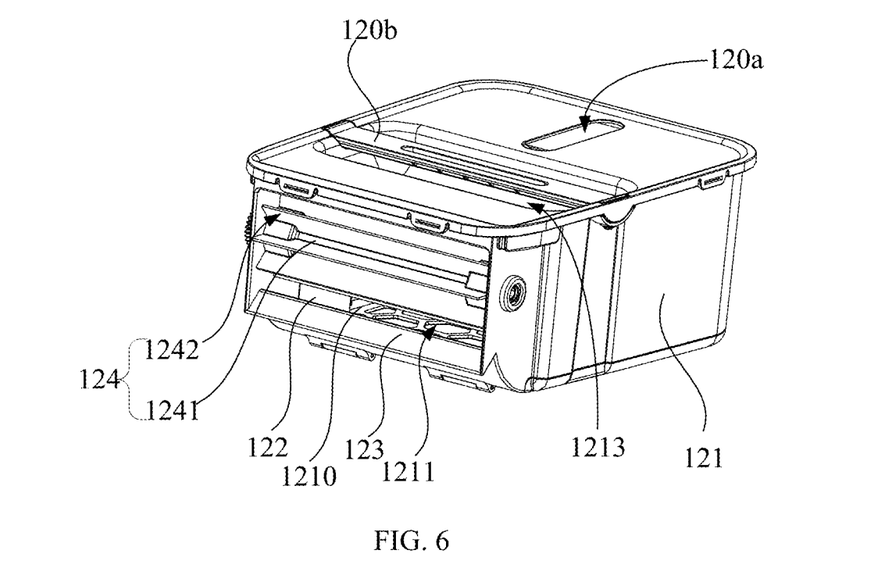
FIG. 6 is a structure diagram of a container according to an embodiment of the present disclosure.

Referring to FIG. 5 and FIG. 6, FIG. 5 is an overall structure diagram of a water surface cleaning robot according to still another embodiment of the present disclosure, and FIG. 6 is a structure diagram of a container according to an embodiment of the present disclosure.

In some embodiments, the container 120 includes a bin body 121 and at least one blocking member 122.

The bin body 121 is defined with a receiving cavity 1210 and an inlet 1211 communicated with the receiving cavity 1210. The inlet 1211 is configured to allow the garbage entering into the receiving cavity 1210, and the receiving cavity 1210 is configured to store the garbage. The receiving cavity 1210 is provided with two cavity walls 12101 that are spaced and face each other.

The at least one blocking member 122 is protruded from at least one cavity wall 12101. The blocking member 122 is configured to block the garbage in the receiving cavity 1210 from overflowing towards the inlet 11 along the cavity walls 12101.

In the embodiments, the container 120 includes the bin body 121, and the bin body 121 is defined with the receiving cavity 1210 and the inlet 1211 that are communicated with each other. The garbage collected by the water surface cleaning robot may enter the receiving cavity 1210 through the inlet 1211, and be stored in the receiving cavity 1210 until the storage space of the receiving cavity 1210 is full. The bin body 121 includes two cavity walls 12101 spaced and facing each other. The container 120 further includes at least one blocking member 122. At least one of the two cavity walls 12101 of the bin body 121 is provided with the protruding blocking member 122. The blocking member 122 is configured to prevent the garbage in the receiving cavity 1210 from overflowing toward the inlet 1211 along the cavity wall 12101 provided with the protruding blocking member 122.

The specific working principle of the container 120 is as follows:

When the water surface cleaning robot navigates on the water surface, garbage can be collected by a cleaning system of the water surface cleaning robot and guided to the inlet 1211 of the container 120. The garbage enters into the receiving cavity 1210 through the inlet 1211 and is stored in the receiving cavity 1210. The cavity walls 12101 of the receiving cavity 1210 are provided with at least one blocking member 122. The blocking member 122 is protruded from the cavity wall 12101 and is configured to prevent the garbage from moving along the cavity wall 12101 and overflowing out of the container 120 through the inlet 1211.

The container 120 with the aforementioned structures achieves the following effects:

By providing the at least one blocking member 122 protruding from the cavity walls 12101 of the bin body 121, the garbage in the bin body can be blocked by the at least one blocking member 122, thus preventing the garbage from overflowing from the inlet 1211 along the cavity walls 12101, which reduces the possibility of repeating cleaning operations caused by the overflowing of the collected garbage.

Figure 7:
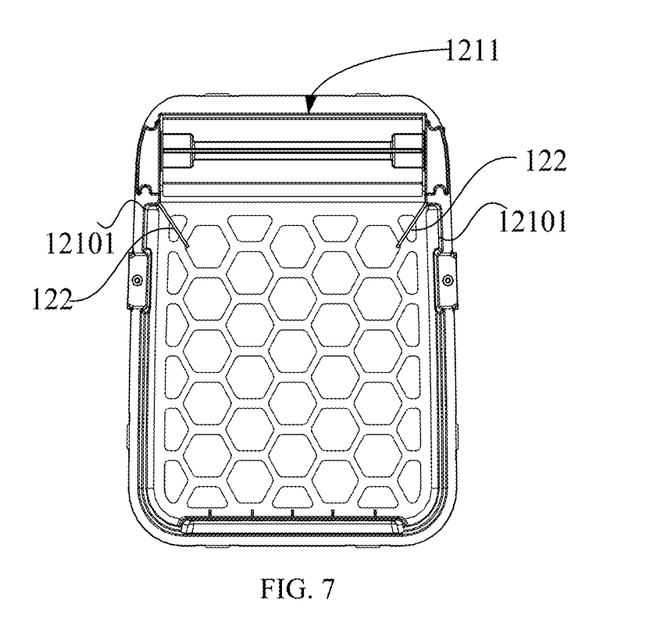
FIG. 7 shows an internal structure of the container in FIG. 6 from a bottom view.

Referring to FIG. 7, in some embodiments, each of the two cavity walls 12101 is provided with one blocking member 122. Each blocking member 122 includes a connecting end and a free end. The connecting end is connected to the cavity wall 12101, and the free end extends in the receiving cavity 1210. The distance from the connecting end to the inlet 1211 is less than the distance from the free end to the inlet 1211. The two blocking members 122 extend from their connecting ends to their free ends with a gradually decreasing distance therebetween.

In the embodiments, the two blocking members 122 may be respectively disposed on two cavity walls 12101 spaced apart and opposite each other of the receiving cavity 1210. The two blocking members 122 may form a symmetrical structure. The linear distance from the connecting end of the blocking member 2 to the inlet 1211 is less than the linear distance from the free end of the blocking member 122 to the inlet 1211. The two free ends are not connected, and the gap between the two free ends is configured for garbage to pass. That is, the garbage moves from the side of the blocking member 122 facing the inlet 1211 to the side of the blocking member 122 facing away from the inlet 1211, and the garbage is blocked by the blocking member 2 on the side of the blocking member 122 facing away from the inlet 1211 to prevent the garbage from overflowing along the cavity wall 12101 to the inlet 1211.

The blocking member 122 with the aforementioned structures effectively prevents the garbage stored in the receiving cavity 1210 from overflowing along the cavity walls 12101 to the inlet 1211 and out of the container 120. To a certain extent, this arrangement avoids the issue of repeated operations caused by the overflow of collected garbage of the water surface cleaning robot.

In some embodiments, the receiving cavity 1210 of the bin body 121 is a box structure having a front wall surface, a rear wall surface, a left wall surface, a right wall surface, an upper wall surface, and a lower wall surface; wherein the front wall surface faces the rear wall surface, the left wall surface faces the right wall surface, and the upper wall surface faces the lower wall surface. The two blocking members 122 may be respectively disposed on the left wall surface and the right wall surface, or respectively disposed on the upper wall surface and the lower wall surface.

Referring to FIG. 7, the two blocking members 2 are respectively disposed on the left wall surface and the right wall surface of the receiving cavity 1210. In the configuration that the two blocking members 122 are respectively disposed on the upper wall surface and the lower wall surface, the aforementioned technical effect of preventing the garbage stored within the receiving cavity 1210 from overflowing toward the inlet 1211 and out of the container 120 along the cavity walls 12101 can also be achieved to some extent. Those skilled in the art can adjust the configuration based on specific requirements.

In some embodiments, the height of the blocking member 122 is generally equal to the distance between the upper wall surface and the lower wall surface of the receiving cavity 1210, to prevent tiny garbage from overflowing toward the inlet 1211 from the gap between the top end of the blocking member 122 and the upper wall surface and/or the gap between the bottom end of the blocking member 122 and the lower wall surface.

Referring to FIG. 6, in some embodiments, the container 120 further includes a guide plate 123. The guide plate 123 is disposed below the inlet 1211, and extends obliquely upward toward the side where the receiving cavity 1210 is located with an inclination angle of 45°±10° relative to a horizontal line.

In the embodiments, the guide plate 123 is mainly configured to guide the garbage smoothly into the receiving cavity 1210. The guide plate 123 is disposed below the inlet 1211, and extends obliquely upward toward the side where the receiving cavity 1210 is located with the inclination angle of 45°±10° relative to the horizontal line. Compared to a flat inlet, the inlet 11 provided with the guide plate 123 has a larger intake area, making it more effective to guide the garbage into the receiving cavity 1210.

When the garbage enters the container 120 through the inlet 1211, it first contacts the guide plate 123. Due to the arrangement that the guide plate 123 extends obliquely upward toward the side where the receiving cavity 1210 is located with the inclination angle of 45°±10° relative to the horizontal line, the garbage slides into the container cavity along the surface of the guide plate 123.

The guide plate 123 with the aforementioned structures achieves the following effects:

First, the inclined guide plate 123 enlarges the effective intake area of the inlet 1211, enhancing the intake efficiency of the garbage.

Second, the inclined guide plate 123 further allows the garbage to slide smoothly into the receiving cavity 1210, which improves the intake efficiency of the garbage, thereby avoiding accumulation and blockage at the inlet 1211.

In summary, the guide plate 123 facilitates an effective guidance of the garbage, which improves the efficiency of the garbage intake into the receiving cavity 1210 and helps to prevent blockages at the inlet 1211, thereby enhancing the performance and operational stability of the water surface cleaning robot.

In some embodiments, the inlet 1211 is shaped to be a trumpet-shaped structure.

Referring to FIG. 6, in some embodiments, the container 120 further includes a cleaning assembly 124 rotatably mounted at the inlet 1211. The cleaning assembly 124 is configured to clean the garbage and transfer the garbage to the receiving cavity 1210 through the inlet 1211.

In the embodiments, the cleaning assembly 124 is configured to clean the garbage on the water surface before the garbage enters the container, and transfer the garbage to the receiving cavity 1210 through the inlet 1211.

The working process of the cleaning assembly 4 in the embodiments is:

Rotational Cleaning: The cleaning assembly 124 is mounted at the inlet 1211 and is rotatable relative to the bin body 121. The cleaning assembly 124 is powered by either an external driving source or its own driving source. By rotating, it cleans and stirs up the garbage on the water surface.

Garbage Cleaning: During rotation, the cleaning assembly 124 cleans debris and waste on the water surface, and stirs them toward the inlet 1211.

Transfer to Receiving cavity 1210: The garbage is guided to enter the receiving cavity 1210 through the inlet 1211 by the cleaning assembly 124, and accumulates in the receiving cavity 1210.

By arranging the cleaning assembly 124 at the inlet 1211, it facilitates the cleaning assembly 124 to collect the garbage into the receiving cavity 1210.

Referring to FIG. 6, in some embodiments, the cleaning assembly 124 includes a main rod body 1241 and a plurality of blades 1242 arranged at intervals on an outer periphery of the main rod 1241 along a circumferential direction of the main rod body 1241.

Or, the cleaning assembly 1214 is a cleaning roller.

That is, in the embodiments, the cleaning assembly 124 may be a rotary blade including the main rod body 1241 and the plurality of blades 1242, or the cleaning assembly 124 is a cleaning roller.

In the case that the cleaning assembly 124 includes the main rod body 1241 and the plurality of blades 1242, the main rod body 1241 serves as a support structure, and the plurality of blades 1242 are fixed on the main rod body 1241. The blades 1242 are arranged at intervals along the circumferential direction of the main rod body 1241.

When the cleaning assembly 124 rotates, the plurality of blades 1242 may stir up the garbage on the water surface. The rotational movement of the plurality of blades 1242 causes the blades 1242 to sweep across the water surface, stirring or pushing the garbage toward the inlet 1211 and transferring the garbage to the receiving cavity 1210.

The arrangement of the plurality of blades 1242 enables the cleaning assembly 124 to efficiently clean the garbage on the water surface, thereby improving the cleaning efficiency. The plurality of blades 1242 can thoroughly mix and stir up the garbage on the water surface during the rotation process, which is conducive to collecting the garbage. Through the stirring effect of the plurality of blades 1242, the collected garbage is smoothly transferred into the receiving cavity 1210. Moreover, the plurality of blades 1242 arranged at intervals are less prone to garbage entanglement than the normal brush-type cleaning assembly.

In the case that the cleaning assembly 124 is a cleaning roller, the cleaning assembly 124 cleans up the garbage on the water surface through its rolling motion. The rolling of the cleaning roller moves the garbage along the surface of the cleaning roller, realizing the functions of cleaning and transferring.

During the rolling process, the surface of the cleaning roller is in contact with the water surface, cleaning and moving the garbage on the water surface into the interior of the cleaning roller. As the cleaning roller rolls, the garbage is transferred to the inlet 1211 and enters the receiving cavity 1210.

The beneficial effects of using a cleaning roller is that it has a simple and efficient cleaning function, and is suitable for large-scale water surface clean. The rolling motion of the cleaning roller can continuously transfer garbage to the inlet 1211, ensuring smooth cleaning and collection of garbage.

Referring to FIG. 6, in some embodiments, the top and/or the side of the bin body 121 is provided with a viewing window 120a, which allows for easy observation of collection of the garbage in the receiving cavity 1210.

In the embodiments, the viewing window 120a may be made of a transparent or translucent material, or it may be a through hole opened at the top of the bin body 121. This allows users to observe the collection of garbage in the receiving cavity 1210 from outside the bin body 121, aiding in monitoring and management of the garbage disposal process. In some embodiments, the viewing window 120a is made of a transparent material, such as transparent plastic or tempered glass. This material has good light transmission and durability, thus can provide a clear view without affecting the structural strength of the container 120, allowing users to easily observe the collection of garbage in the container 120.

The size and shape of the viewing window 120a are optimized according to the design of the container 120 to ensure that users clearly see the internal condition from different angles.

During operation, when the water surface cleaning robot performs garbage collection tasks, users may monitor the garbage level inside the container 120 through the viewing window 120a at any time. This allows users to assess when it is necessary to empty the container 120. The viewing window 120a allows users to monitor the internal condition without frequently opening the cover plate 130, thereby improving convenience and efficiency of the operation. When the garbage in the container 120 reaches a certain level, users can easily open the cover plate 130 by the locking structure 133, and remove the container 120 to dump the garbage. The entire process is simple and quick.

Through the viewing window 120a, users can directly observe the garbage accumulation in the receiving cavity 1210, so as to access whether cleaning and processing are needed. The viewing window 120a helps to avoid the need for frequently opening the container 120 to check on the garbage, thereby saving user's time and effort while improving observation efficiency. This aids users in managing garbage collection and processing more effectively, ultimately enhancing work efficiency.

Referring to FIG. 6, in some embodiments, the top of the bin body 121 is provided with a handle 120b for facilitating users to hold the container 120.

In the embodiments, the handle 120b is configured to allow users to easily carry the container 120. Users may conveniently and quickly lift or tilt the entire container 120 by the handle 120b, facilitating maintenance and cleaning. This is beneficial for maintaining the water surface cleaning robot in good condition and prolonging the service life.

The handle 120b is ergonomically designed, allowing users to easily grip and lift the container 120. The handle 120b may be made of durable plastic or stainless steel, which not only has good strength and corrosion resistance, but also maintains a long service life in the daily use of the water surface cleaning robot.

The handle 120b is disposed next to the viewing window 120a, ensuring the best grip angle and mechanical balance without affecting the viewing function.

When the garbage in the container 120 needs to be dumped, users can conveniently lift the container 120 by the handle 120b. That is, the handle 120b makes it more labor-saving and safer for users to lift, carry, and dump the garbage. In combination with the locking structure 133, users can easily open the cover plate 130, and grab the handle 120b to lift the container 120 for performing garbage cleaning and disposal tasks. The whole operation process is simple and efficient, significantly improving the practicability of the water surface cleaning robot.

Figure 8:
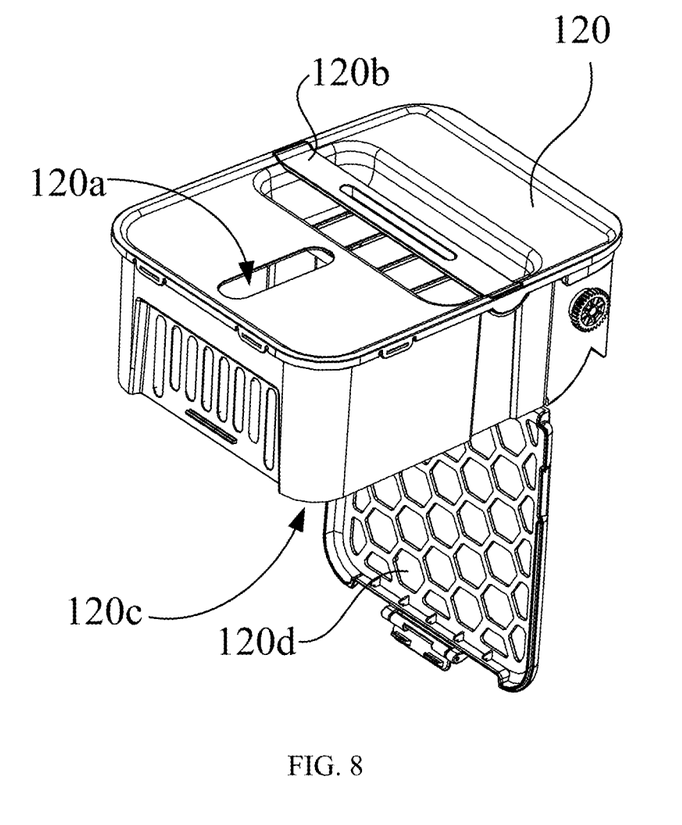
FIG. 8 is a structure diagram of a container according to another embodiment of the present disclosure.

Referring to FIG. 8, in some embodiments, the top of the bin body 121 is further defined with a recess 1212, and the bottom of the recess 1212 is defined with a water hole 1213 communicated with the receiving cavity 1210. The handle 120b is arranged across the opening of the recess 1212.

In the embodiments, the top of the bin body 121 is defined with the recess 1212, and the handle 120b is arranged across the opening of the recess 1212. The recess 1212 is configured to provide a certain avoidance space for the handle 120b, which is convenient for users to hold the handle 120b to carry or tilt the container 120.

Further, the bottom of the recess 1212 is defined with the water hole 1213. The function of the water hole 1213 is that: the water surface cleaning robot is typically used outdoors, and the installation position of the container 120 does not guarantee a completely sealed environment. During use, liquid splashing onto the top of the bin body 121 or rainwater during inclement weather may cause water accumulation on the upper part of the bin body 121. Therefore, by providing the water hole 1213 communicated with the receiving cavity 1210, the top of the bin body 121 will not easily accumulate water. Any accumulated water will flow into the receiving cavity 1210 through the water hole 1213 and is then expelled via a drainage system of the water surface cleaning robot.

Referring to FIG. 8, in some embodiments, the bottom of the bin body 121 is provided with an outlet 120c and a lid body 120d. The outlet 120c is configured to quickly discharge the garbage in the container 120 when dumping the garbage. The lid body 120d is configured to open or close the outlet 120c. One end of the lid body 120d is rotatably connected with the bin body 121, and the other end of the lid body 120d is snap-fitted with the bin body 121.

In the embodiments, the outlet 120c is an outlet configured to discharge the garbage collected in the receiving cavity 1210. When dumping the garbage, users may open the lid body 120d to expose the outlet 120c, such that the garbage is removed through the outlet 120c for emptying. After the emptying operation is completed, users may close the lid body 120d to close the outlet 120c for the next garbage collection.

The size of the outlet 120c is moderate, which ensures smooth discharge of the garbage and prevent accidental leakage of the garbage during normal operation.

The lid body 120d is configured to close the outlet 120c to prevent the garbage from overflowing during collection and transferring. One end of the lid body 120d is rotatably connected to the bin body 121 by a hinge structure, and the other end of the lid body 120d is connected to the bin body 121 by a snap-fit structure, to ensure that the lid body 120d securely closes the outlet 120c.

In an actual operation process, when the garbage in the container 120 needs to be dumped, users may first open the cover plate 130 by the unlocking handle 133c, and lift the container 120. Then, users may carry the container 120 to a garbage disposal area, and open the lid body 120d disposed at the bottom the container 120. Users may easily unlock the lid body 120d by simply operating the snap-fit structure, and rotate the lid body 120d to quickly discharge the garbage through the outlet 120c. After dumping is complete, users may rotate the lid body 120d back to its original position and fasten it using the snap-fit structure, ensuring that the outlet 120c is securely closed to prevent any garbage leakage.

In the embodiments, the arrangement of the outlet 120c and the lid body 120d that are disposed at the bottom of the container 120 makes the garbage removal more convenient and efficient, allowing users to dump the garbage without flipping the entire container 120. Moreover, the snap-fit structure and the hinge structure ensure that the lid body 120d is firm and reliable in the closed state, which effectively prevents the overflow of the garbage during the operation.

The outlet 120c simplifies garbage removal and enhances cleaning efficiency. Through the outlet 120c, users can easily clean the garbage in the container 120, reducing the complexity of the operation. Compared to a normal outlet defined in the upper part of the bin body 121, the outlet 120c defined in the bottom of the bin body 121 is more advantageous for garbage removal. In the case that the outlet 120c is located at the bottom of the bin body 121, users need only open the lid body 120d for cleaning. In contrast, in the case that the outlet is located at the top of the bin body 121, users must open the top lid and then tip the bin body 121 to dump the garbage, which is a more cumbersome process.

The lid body 120d serves as an opening and closing device of the outlet 120c for controlling the opening and closing of the outlet 120c. One end of the lid body 120d may be rotatably connected with the bin body 121, and the other end of the lid body 120d may be snap-fitted to the bin body 121. When it is necessary to dump the garbage in the receiving cavity 1210, users may unlock the snap-fit structure, and rotate the lid body 120d to open the outlet 120c, so as to perform the garbage disposal operation.

The rotatable design and the snap-fit design of the lid body 120d allow users to quickly open or close the outlet 120c, which simplifies the operation process.

Figure 9:
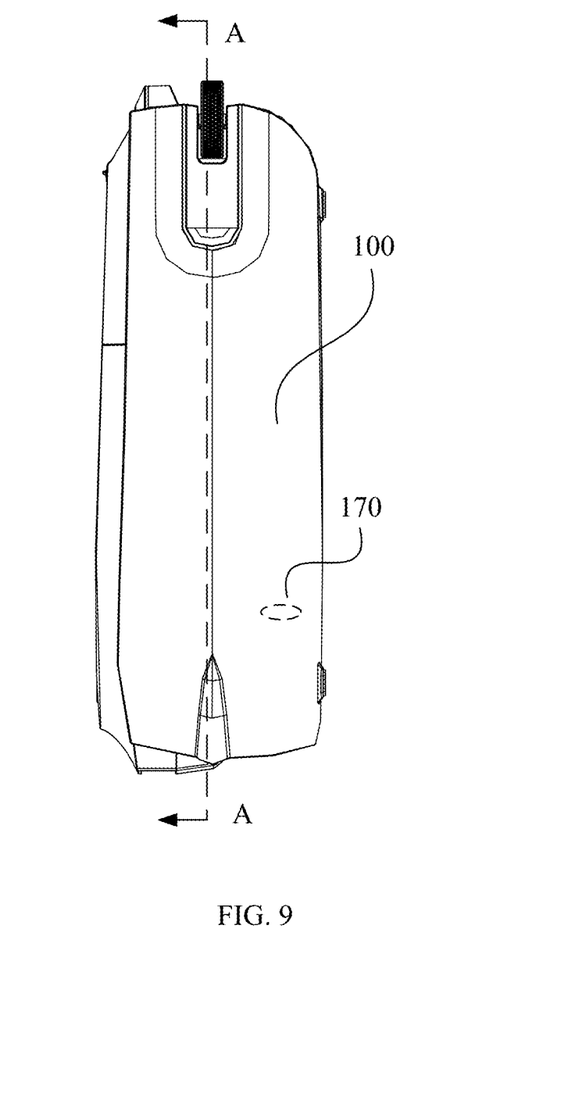
FIG. 9 is a side view of a water surface cleaning robot according to an embodiment of the present disclosure.
Figure 10:
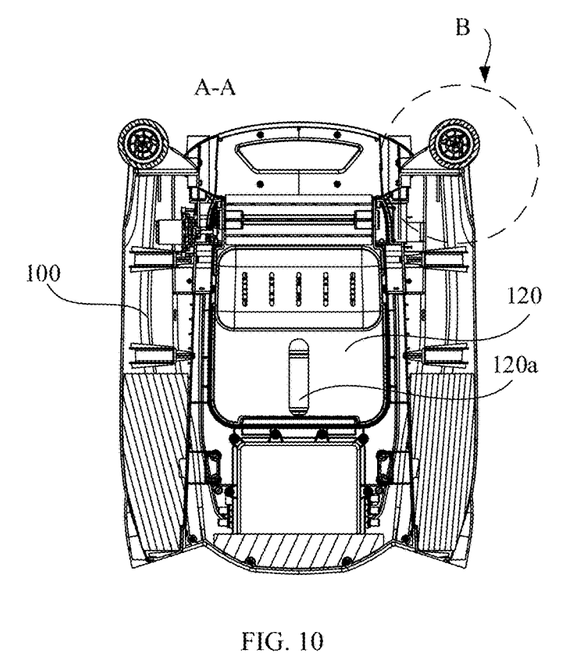
FIG. 10 is a cross-section view taken along line A-A in FIG. 9.
Figure 11:
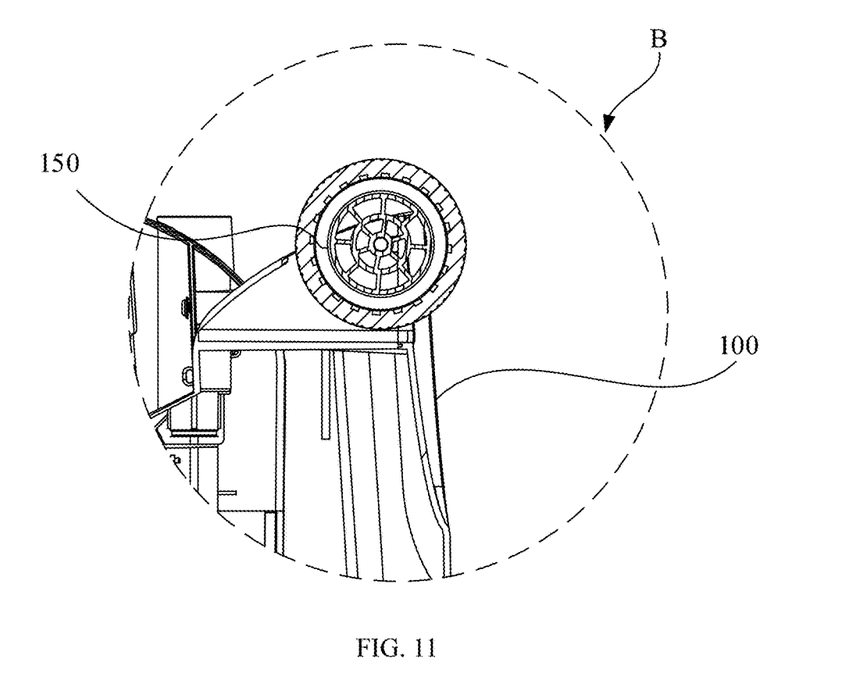
FIG. 11 is a structure diagram of portion B in FIG. 10.

Referring to FIG. 9 to FIG. 11, in some embodiments, the water surface cleaning robot further includes:

an anti-collision assembly 150, the anti-collision assembly 150 including at least an outer side portion protruding beyond the robot body 100.

In the embodiments, the water surface cleaning robot further includes the anti-collision assembly 150. The anti-collision assembly 150 is disposed on the outer side of the robot body 100 for providing cushion and protection when hitting an obstacle.

The anti-collision assembly 150 includes at least the outer side portion protruding beyond the robot body 100. This design effectively absorbs and disperses impact forces during collisions, preventing direct damage to the robot body 100. In some embodiments, the anti-collision assembly 150 may be a rubber ball or spring, or other components with high elasticity. A rubber ball offers excellent elasticity and impact resistance. When the robot body 100 collides with an obstacle, the rubber ball can absorb impact energy through deformation, thereby reducing the force of impact on the robot body 100. A spring serves a similar function by effectively cushioning impacts through its compression and rebound characteristics.

In some other embodiments, the anti-collision assembly 150 may be made of metal, alloy, or other rigid materials. The rigid materials have high strength and durability, and can provide strong protection in the event of a collision, to prevent the surface of the robot body from directly contacting obstacles. In case that the anti-collision assembly is made of metal or an alloy material, the anti-collision assembly may be designed into various shapes, such as a bumper or a collision-resistant plate, to accommodate different collision scenarios and protection requirements.

In actual use, the water surface cleaning robot, driven by moving assembly 141, moves on the water surface for garbage cleaning. When encountering an obstacle, the anti-collision assembly 150 first comes into contact with the obstacle, and absorbs and disperses the impact force by its own elastic or rigid property, protecting the robot body 100 from damage. The anti-collision assembly 150 made of an elastic material can cushion the impact by deformation, while the impact member of the rigid material provides strong protection by its strength and hardness. This design not only improves the durability and reliability of the water surface cleaning robot, but also reduces the cost of maintenance and repair.

This anti-collision design has significant benefits. First, the anti-collision assembly 150 effectively reduces the risk of injury when the water surface cleaning robot collides with obstacles during the cleaning process, and improves the safety and service life of the water surface cleaning robot. Second, the anti-collision assembly 150 made of an elastic material can absorb impact energy through deformation and provide a flexible cushioning effect, and the anti-collision assembly made of a rigid material provides reliable protection through its robustness.

Referring to FIG. 10 and FIG. 11, in the embodiments, the anti-collision assembly 150 is a roller or a bearing rotatably connected to an outer side wall of the robot body 100.

In the embodiments, the anti-collision assembly 150 is a roller or a bearing rotatably connected to the outer side wall of the robot body 100. This design aims to cushion impact forces through rolling contact during collisions, thereby protecting the robot body 100 from damage.

In some embodiments, each of four corners of the robot body 100 is provided with one roller. The sizes of the rollers are carefully designed to ensure they effectively contact with obstacles and provide a cushioning effect during collisions. The surface of the roller may be covered with an elastic material, such as rubber or silicone, to enhance its ability to absorb impact forces, further reducing the damage to the robot body 100. This design not only improves the collision resistance but also increases the durability and safety of the water surface cleaning robot.

In some embodiments, the anti-collision assembly 150 is a roller. When the water surface cleaning robot moves on the water surface and comes into contact with an obstacle, the roller makes rolling contact with the surface of the obstacle. This rolling interaction effectively cushions impact forces, which reduces the amount of shock energy directly transmitted to the robot body, thereby preventing damage to the robot body. The roller can rotate freely benefit from its mounting manner, thus adapting to collisions from various directions while maintaining a stable protective performance.

This collision-resistant design offers significant advantages. First, by making rolling contact with obstacles, the roller effectively distributes and cushions impact forces, thereby enhancing the durability of the water surface cleaning robot. Second, the roller has a simple structure, thus it is easy to install and has low maintenance costs. Finally, this design increases the flexibility and adaptability of the water surface cleaning robot during cleaning operations, ensuring safe and stable performance in complex water surface environments. By providing the anti-collision assembly 150, the water surface cleaning robot can perform garbage removal tasks more efficiently and reliably.

Referring to FIG. 1, in some embodiments, the water surface cleaning robot further includes an ultrasonic sensing component 160 disposed on a front side of the robot body 100.

In the embodiments, the water surface cleaning robot further includes the ultrasonic sensing component 160 disposed on the front side of the robot body 100 for detecting and avoiding obstacles, thereby improving the intelligence and safety of the water surface cleaning robot.

In the embodiments, the ultrasonic sensing component 160 that is mounted on the front side of the robot body 100 may be housed in a waterproof housing to adapt to the water surface environment, ensuring its normal operation in humid or water-rich conditions. The ultrasonic sensing component 160 transmits ultrasonic signals and receives reflected signals to measure a distance between the water surface cleaning robot and an obstacle. The ultrasonic sensing component 160 is connected to a control system of the robot body 100, and it uses real-time feedback information for path planning and obstacle avoidance operations.

During actual operation, when the water surface cleaning robot moves on the water surface and clean the garbage, the ultrasonic sensing component 160 continuously transmits and receives ultrasonic signals. If an obstacle appears ahead, such as a floating object, a boat, or the water's edge, the ultrasonic sensing component 160 quickly detects it and immediately sends a signal back to the control system. The control system calculates the distance to the obstacle based on the received signal and promptly adjusts the movement path of the water surface cleaning robot to avoid collisions and prevent damage.

In the embodiments, the ultrasonic sensing component 160 enhances the level of intelligence of the water surface cleaning robot, enabling it to autonomously detect and avoid obstacles with reduced need for human intervention. Moreover, the ultrasonic detection technology is noted for its high precision and sensitivity, allowing stable operation in complex water surface environments and ensuring the safe operation of the water surface cleaning robot. Finally, this obstacle avoidance capability effectively prevents collisions and damage during cleaning operations, which extends the service life of the water surface cleaning robot, and enhances the overall work efficiency and reliability, thereby providing a more intelligent and safe solution for water surface garbage cleaning.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. A water surface cleaning robot, comprising:
   a robot body, configured to clean garbage on a water surface, the robot body being defined with a mounting cavity, and a top of the robot body being defined with an opening communicated with the mounting cavity;
   a container detachably mounted in the mounting cavity of the robot body, the container being configured to store garbage collected by the robot body;
   a cover plate, configured to open or cover the opening;
   wherein, the cover plate comprises a cover plate body, a rotating connection structure disposed on one side of the cover plate body, and a locking structure disposed on the other opposite side of the cover plate body;
   the rotating connection structure is rotatably connected with one side edge of the opening, and the locking structure is latched with the other side edge of the cavity; and
   a moving assembly mounted on the robot body, the moving assembly being configured to drive the robot body to move on the water surface;
   wherein the other opposite side edge of the opening is defined with an engaging groove; and
   the locking structure comprises:
   a base connected with the cover plate body or integrally formed with the cover plate body;

a locking tongue retractably mounted on the base, the locking tongue being configured to be engaged with the engaging groove;

an unlocking handle rotatably connected to the base and connected to the locking tongue, the unlocking handle being configured to rotate relative to the base under an action of an external force and drive the locking tongue to disengage from the engaging groove to retract into the base; and a first elastic member connected between the unlocking handle and the base, the first elastic member being configured to drive the unlocking handle to reset the locking tongue when the external force applied to the unlocking handle is removed.

2. The water surface cleaning robot according to claim 1, wherein the first elastic member is one of two first elastic members, and the two first elastic members are spaced apart along a length direction of the unlocking handle.

3. The water surface cleaning robot according to claim 1, wherein a power supply is provided in the robot body; and a solar panel is provided on a side of the cover plate body facing away from the opening, and the solar panel is electrically connected to the power supply.

4. The water surface cleaning robot according to claim 1, wherein the container comprises:

a bin body, the bin body being defined with a receiving cavity and an inlet communicated with the receiving cavity, the inlet being configured to allow the garbage to enter the receiving cavity, the receiving cavity being configured to store the garbage, and the receiving cavity being provided with two cavity walls that are spaced and face each other; and at least one blocking member protruded from at least one of the two cavity walls, the at least one blocking member being configured to block the garbage in the receiving cavity from overflowing toward the inlet along the cavity walls.

5. The water surface cleaning robot according to claim 4, wherein each of the two cavity walls is provided with the blocking member, each of the two blocking members comprises a connecting end and a free end, the connecting end is connected to the cavity wall, the free end extends in the receiving cavity, a distance from the connecting end to the inlet is smaller than a distance from the free end to the inlet, and the two blocking members extend from the connecting ends to the free ends with a gradually decreasing distance therebetween.

6. The water surface cleaning robot according to claim 4, wherein the container further comprises a guide plate, the guide plate is disposed below the inlet, and the guide plate extends obliquely upward toward a side where the receiving cavity is located with an inclination angle of 45°±10° relative to a horizontal line.

7. The water surface cleaning robot according to claim 4, wherein the container further comprises a cleaning assembly rotatably mounted at the inlet, and the cleaning assembly is configured to clean the garbage and transfer the garbage to the receiving cavity through the inlet.

8. The water surface cleaning robot according to claim 7, wherein the cleaning assembly comprises a main rod body and a plurality of blades arranged at intervals on an outer periphery of the main rod body along a circumferential direction of the main rod body;

or the cleaning assembly is a cleaning roller.

9. The water surface cleaning robot according to claim 4, wherein a top of the bin body is provided with a handle for users to hold the container.

10. The water surface cleaning robot according to claim 9, wherein the top of the bin body is defined with a recess, and a bottom of the recess is defined with a water hole communicated with the receiving cavity; and the handle is arranged across an opening of the recess.

11. The water surface cleaning robot according to claim 4, wherein a top and/or a side of the bin body is provided with a viewing window for observing collection of the garbage in the receiving cavity.

12. The water surface cleaning robot according to claim 4, wherein a bottom of the bin body is defined with an outlet and a lid body, and the lid body is configured to open or close the outlet;

wherein one end of the lid body is rotatably connected with the bin body, and the other end of the lid body is snap-fitted with the bin body.

13. The water surface cleaning robot according to claim 1, further comprising:

an anti-collision assembly, the anti-collision assembly comprising at least an outer side portion protruding from the robot body.

14. The water surface cleaning robot according to claim 13, wherein the anti-collision assembly is a roller or a bearing rotatably connected to an outer side wall of the robot body.

15. The water surface cleaning robot according to claim 1, further comprising:

an ultrasonic sensing component disposed on a front side of the robot body.

* * * * *